United States Patent [19]
Merving

[11] Patent Number: 5,207,021
[45] Date of Patent: May 4, 1993

[54] TREE TREATMENT CAPSULE

[76] Inventor: Hans A. K. Merving, August Stalbergsvag 10A, 644 00 Torshalla, Sweden

[21] Appl. No.: 555,734

[22] Filed: Jul. 23, 1990

Related U.S. Application Data

[63] Continuation-in-part of Ser. No. 410,884, Sep. 22, 1989, Pat. No. 5,010,684, which is a continuation-in-part of Ser. No. 393,841, Aug. 7, 1989, Pat. No. 4,905,410, which is a continuation of Ser. No. 184,072, Apr. 20, 1988, abandoned.

[51] Int. Cl.⁵ .............................................. A01G 29/00
[52] U.S. Cl. ...................................................... 47/57.5
[58] Field of Search ...................... 47/57.5, 51, 52, 53, 47/8, 11

[56] References Cited

U.S. PATENT DOCUMENTS 5,010,684  4/1991  Merving ........................ 47/57.5

Primary Examiner—David A. Scherbel
Assistant Examiner—Joanne C. Downs
Attorney, Agent, or Firm—Keck, Mahin & Cate

[57] ABSTRACT

A tree treatment capsule is disclosed as including a plastic container having a shank with an internal cavity for containing therein a chemical agent and a head integrally formed with the shank portion. A plastic plug is provided to sealingly close the cavity. The shank has a plurality of scorings which are formed in the exterior surface thereof and extend lengthwise of the shank The scorings allow the shank to be broken so that when an impact force is applied to the head to move the shank towards the plastic plug, the plastic plug expands and breaks the shank along the scorings into tongues to form slits between the tongues. The slits allow the chemical agent to pass from the cavity of the capsule through the slits and mix with sap of the tree.

9 Claims, 1 Drawing Sheet

5,207,021

TREE TREATMENT CAPSULE

This application is a continuation-in-part of U.S. patent application Ser. No. 07/410,884, filed Sep. 22, 1989, which is a continuation-in-part of U.S. patent application Ser. No. 07/393,841, filed Aug. 7, 1989, now U.S. Pat. No. 4,905,410, which in turn is a continuation of U.S. patent application Ser. No. 07/184,072, filed Apr. 20, 1988, now abandoned.

FIELD OF THE INVENTION

The present invention relates to a tree treatment capsule for feeding a chemical agent into plants and, more particularly, to a capsule for delivering a chemical agent to the phloem layer of a tree. The chemical agent may be either a herbicide or any other tree destroying agent if the treatment is designed to kill the tree, or a fungicide or other medicant or nutrient if the treatment is designed to cure the tree from a disease or a nutrient deficiency.

BACKGROUND OF THE INVENTION

Heretofore, tree treatment capsules consisting of a generally cylindrical hollow container and a plug for insertion into a pre-drilled hole in a tree to be treated have been known. Such tree treatment capsules have typically been made of a frangible material, or of a hard, brittle, breakable and non-elastic material, such as fiberglass, wood or wood fiber. However, the hollow containers of these known capsules tend to be breakable before they are assembled or even after assembly upon inadvertent application of an external impact.

Tree treatment capsules made of a brittle, breakable plastic material are also known. However, although it is difficult to break such capsules before usage, it is also difficult to break them when they are in use. Consequently, a great deal of force must be applied to provide a large enough impact to cause the capsule to break.

SUMMARY OF THE INVENTION

It is, therefore, an object of the present invention to provide a tree treatment capsule which is difficult to accidentally break before usage, and yet which is easily breakable when an axial impact force is applied.

According to the present invention, a tree treatment capsule is adapted for insertion into a bore of a tree to be treated and includes a plastic container and a plastic plug to sealingly close the container. The plastic container has a cylindrical shank having an internal cavity formed with an end opening for containing therein a chemical agent, and a head integrally formed with the shank remote from the end opening. A plastic plug is tapered from an outer diameter larger than the diameter of the end opening to a diameter just slightly smaller than the diameter of the end opening such that the plug is only partially insertable into the end opening in order to obtain a tight fit between the plug and the end opening of the cavity.

The shank has a plurality of recessed scorings which are formed in the exterior surface thereof at circumferentially equal spacings. The scorings extend from the end opening to the head. The recessed scorings allow the shank to be broken so that as an impact force applied to the head moves the shank towards the plastic plug, the plastic plug expands the end opening and breaks the shank along the recessed scorings into a plurality of tongues, thereby providing slits between the separated tongues through which the chemical agent is allowed to pass from the internal cavity of the capsule. The chemical agent passed from the capsule through the slits then mixes with sap of the tree.

The plastic container and plastic plug are preferably made of different plastic materials in order to permit the shank element to be easily broken when an impact force is applied to the head element and moves the shank element towards the plastic plug.

DESCRIPTION OF THE PREFERRED EMBODIMENT

Figure 1:
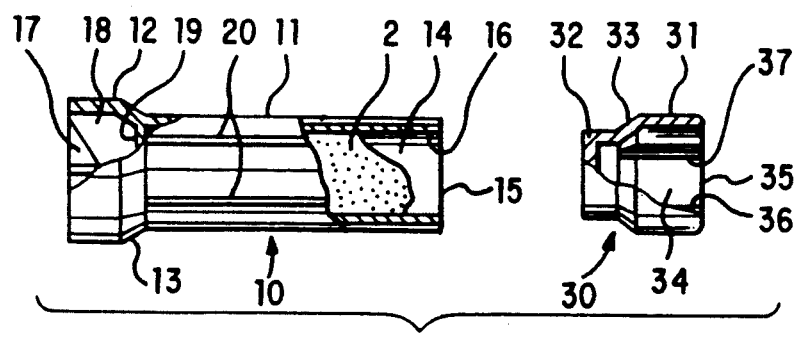
FIG. 1 is an exploded plan view, partly in cross-section, of a tree treatment capsule in accordance with a preferred embodiment of the present invention.

Referring to the drawings, in particular to FIG. 1, the present invention is embodied in a tree treatment capsule 1 adapted for insertion into a pre-drilled bore in the trunk of a tree to be treated. The capsule 1 comprises a generally cylindrical plastic container 10 and a generally cylindrical, hollow plastic plug 30. The container 10 and plug 30 are separate from each other. The cylindrical container 10 includes a cylindrical, hollow shank portion 11 having a cylindrical, hollow head element 12 rigidly joined thereto by a tapered, solid transition portion 13. The head element 12 has an outer diameter larger than an outer diameter of the shank portion 11.

Figure 2:
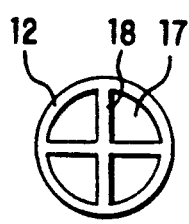
FIG. 2 is an end view of a container of the tree treatment capsule of FIG. 1.

The shank portion is formed as a wall enclosing an internal cavity 14 with one open end 15 of the cavity defined by an opening 16 for containing a tree treating chemical agent 2 therein. The head element 12 also forms an open ended internal cavity 17, in which ribs 18 are integrally formed with the head element 12 and extend crosswise in order to provide a strong, reinforced structure of the hollow head element 12, as is shown in FIG. 2. Internal cavities 14 and 17 are separated by a partition 19. The shank portion 11 has a series of, for example six, equally circumferentially spaced slots or recessed scorings 20 formed in the exterior surface thereof. These recessed scorings 20, longitudinally extending substantially completely from the one end 15 of cavity 14 to the bottom of the shank portion 11, are sufficiently deep so as to make the shank portion make the shank portion easily breakable when the open end 15 of the shank portion 11 is expanded.

Figure 3:
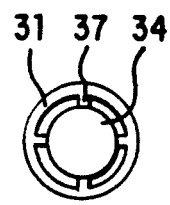
FIG. 3 is a top view of a plug of the tree treatment capsule of FIG. 1.

The plug 30 is formed with an internal cavity 34 with one end 35 defined by an opening 36. The plug includes two cylindrical portions, 31 and 32. The cylindrical portion 31 has substantially the same outer diameter as the outer diameter of the shank portion 11, whereas the cylindrical portion 32 has an outer diameter just smaller than the diameter of the opening 16 of the end 15. As will become clear, because portion 32 has an outer diameter just smaller than the internal diameter of opening 16, portion 32 will be tightly engaged in opening 32 when the capsule is assembled. The cylindrical portions 31 and 32 are joined with each other by a tapered transitional portion 33. The plug 30 also has a series of, for example four, ribs 37 integrally formed with and on the circumferentially internal surface of the cavity 34. Ribs 37 are preferably arranged at equal circumferential spacings, as is shown in FIG. 3. These ribs 37 extend longitudinally from the open end 35 of the plug 30 along the radially inner surfaces of cylindrical portion 31 and tapered transitional portion 33. Ribs 37 terminate at the junction between transitional portion 33 and cylindrical portion 32. The taper of the transitional portion 13 and 33 of the container 10 and plug 30, respectively, may be either straight or curved.

All portions of the capsule 1 are made of brittle plastic materials by, for example, injection molding or extrusion molding. It is specifically preferred to made the container 10 of polystyrene or polycarbonate and the plug 30 of polyethylene. Making the container 10 and plug 30 of these different plastic materials enables the container 10 to be broken more easily than plug 30.

In assembling the capsule 1, the chemical agent 2 is introduced into the cavity 14 of the container 10 and the plug 30 is inserted into opening 16 of the container 10. The cylindrical portion 32 tightly fits in the opening 16 and the tapered transitional portion 33 tightly engages against the circumferential edge of the open end 15 to completely seal off the open end 15. Although a tight fit is obtained between the tapered transitional portion 33 of the plug 30 and the top end 15 of the shank portion 11, it is preferred to adhesively secure the cylindrical portion 32 in the opening 16 in order to provide a superior seal.

The chemical agent 2 may be of any kind of, for example, a herbicide or a fungicide, and in any form of, for example, a tablet, a powder, a jelly-like material, a pasty material, or a liquid.

Figure 4:
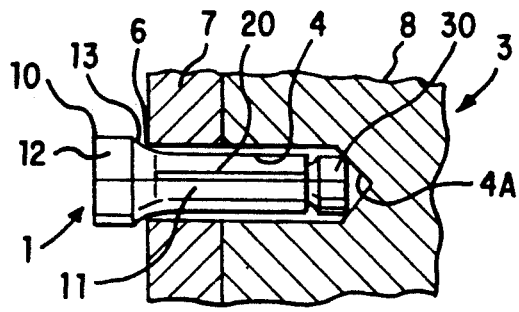
FIG. 4 is a longitudinal plan view of an assembled tree treatment capsule of FIG. 1 shown in a first stage of insertion in a bore in a tree.

The chemical agent containing capsule 1 is inserted into a pre-drilled bore 4 in the trunk of a tree 3 to be treated. As is seen in FIG. 4, the bore 4 is dimensioned to extend through the bark 7 and into the phloem layer 8 of the tree 3. The bore 4 is further dimensioned to have an internal diameter between the external diameters of the shank portion 11 and head element 12, respectively, and a depth slightly greater than the length of the shank portion 11, including the plug 30. The capsule 1 is inserted into the bore 4 of the tree 3 until the plug 30 abuts against a wall, for instance the bottom wall 4A of the bore 4, as is shown in FIG. 4. This brings the tapered transitional portion 13 of the container 10 into contact with the circumferential edge 6 of the bore 4.

Figure 5:
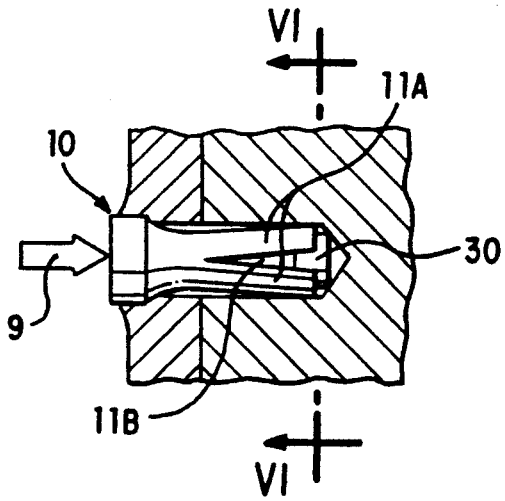
FIG. 5 is a longitudinal plan view of an assembled tree treatment capsule of FIG. 1 shown in a second stage of insertion in a bore in a tree.
Figure 6:
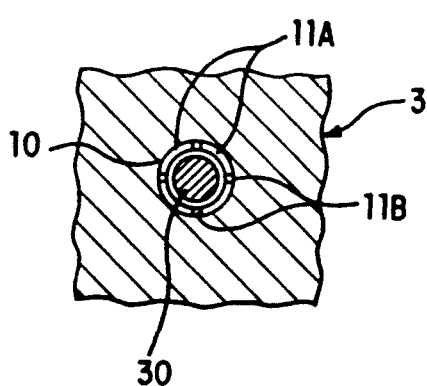
FIG. 6 is a cross-sectional view taken along line VI—VI of FIG. 5.

Impact force is applied to the head element 12 by, for example, hammering, in the direction shown by arrow 9, causing the head element 12 and the shank portion 11 of the container 10 to move toward the plug 30 such that the shank portion 11 climbs up along the tapered portion 33 of the plug 30. The plug 30, in particular the tapered portion 33 thereof, expands the open end 15 of the shank portion 11 and breaks the shank portion 11 along the scorings 20 into tongues 11A, as is shown in FIGS. 5 and 6. The tongues 11A form therebetween passages 11B to permit the chemical agent 2, if it is in a jelly-like or liquid form, to be released and mix with the sap of the tree 3, or to permit the sap of the tree 3, if the chemical agent is in the form of a tablet or a powder, to permeate and mix with the chemical agent 2.

Since the outer diameter of the head element 12 of the capsule 1 is larger than the inner diameter 6 of the originally pre-drilled bore 4, a very tight fit will be obtained between the head element 12 of the capsule 1 and the opening of the bore of the tree 3 after the impact force has been applied. This causes the capsule 1 to be held very firmly in the tree 3. The tongues 11A formed in the shank portion 11 will also be pressed against the internal surface of the bore 4 and be frictionally engaged with the internal surface, so as to contribute to retention of the capsule 1 firmly in bore 4 of tree 3.

It is to be understood that although the invention has been described in detail with respect to a preferred embodiment, nevertheless, various other embodiments and variants are possible which are within the spirit and scope of the present invention, and such embodiments and variants are intended to be covered by the following claims.

What is claimed is:

1. A tree treatment capsule for insertion into a bore in a tree comprising:

a plastic container having a shank with an internal cavity having an end opening containing therein a chemical agent and a head element integrally formed with said shank remote from said end opening;

a plastic plug for sealingly closing said internal cavity, said plastic plug being tapered from an outer external diameter larger than the diameter of said end opening to an outer external diameter slightly smaller than the diameter of said end opening such that said plug is only partially insertable into said end opening in order to provide a tight fit between said plug and said end opening;

said shank having a plurality of recessed scorings which are formed in the exterior surface thereof at circumferentially equal spacings, said scorings extending longitudinally along said shank from said end opening towards said head element and allowing said shank to be broken so that as an impact force applied to said head moves said shank towards said plastic plug, said plastic plug expands said end opening and breaks said shank element along said recessed scorings into a plurality of tongues to form slits between said tongues, thereby allowing said chemical agent to pass from said internal cavity through said slits.

2. A tree treatment capsule as defined in claim 1, wherein said plastic container and said plastic plug are made of different plastic materials.

3. A tree treatment capsule as defined in claim 2, wherein said plastic container is made of polystyrene.

4. A tree treatment capsule as defined in claim 2, wherein said plastic plug is made of polyethylene.

5. A tree treatment capsule as defined in claim 1, wherein said head element has an internal cavity formed with a plurality of ribs in order to provide a strong head element structure.

6. A tree treatment capsule as defined in claim 5, wherein said ribs are integrally formed with said head element and extend cross-wise of said head element in a radial direction.

7. A tree treatment capsule as defined in claim 6, wherein said head element is shaped cylindrically.

8. A tree treatment capsule as defined in claim 1, wherein said plug has an internal cavity formed with a plurality of ribs in order to provide a strong plug structure.

9. A tree treatment capsule as defined in claim 8, wherein said head element is shaped cylindrically.

* * * * *